(12) United States Patent
Haberkorn

(10) Patent No.: US 9,445,274 B2
(45) Date of Patent: Sep. 13, 2016

(54) METHOD FOR PREVENTING FRAUD OR MISUSE WHEN USING A SPECIFIC SERVICE OF A PUBLIC LAND MOBILE NETWORK BY A USER EQUIPMENT, SUBSCRIBER IDENTITY MODULE AND APPLICATION PROGRAM

(75) Inventor: Guenter Haberkorn, Birgland/Schwend (DE)

(73) Assignee: DEUTSCHE TELEKOM AG, Bonn (DE)

( * ) Notice: Subject to any disclaimer, the term of this patent is extended or adjusted under 35 U.S.C. 154(b) by 136 days.

(21) Appl. No.: 14/344,626

(22) PCT Filed: Sep. 13, 2011

(86) PCT No.: PCT/EP2011/004583
§ 371 (c)(1),
(2), (4) Date: Jul. 3, 2014

(87) PCT Pub. No.: WO2013/037383
PCT Pub. Date: Mar. 21, 2013

(65) Prior Publication Data
US 2015/0044999 A1 Feb. 12, 2015

(51) Int. Cl.
*H04M 1/66* (2006.01)
*H04W 12/12* (2009.01)
(Continued)

(52) U.S. Cl.
CPC ............... *H04W 12/12* (2013.01); *H04W 4/12* (2013.01); *H04W 88/02* (2013.01)

(58) Field of Classification Search
CPC . H04W 88/184; H04W 40/00; H04W 12/08; H04W 12/06; H04W 12/12; G06F 21/335; G06F 21/121; G06F 12/145; H04L 63/0823; H04L 9/321; H04L 9/3271; H04L 12/5895; H04L 67/04; H04L 63/08; H04M 3/382; H04M 3/00
USPC ......................................... 455/410, 411, 558
See application file for complete search history.

(56) References Cited

U.S. PATENT DOCUMENTS

| | | | | |
|---|---|---|---|---|
| 2002/0116384 | A1* | 8/2002 | Laurila | ............... H04L 63/0853 |
| 2003/0182560 | A1* | 9/2003 | Brizek | ................. G06F 12/145 713/189 |

(Continued)

FOREIGN PATENT DOCUMENTS

| | | |
|---|---|---|
| EP | 1225747 A1 | 7/2002 |
| WO | WO 03005738 A2 | 1/2003 |

*Primary Examiner* — Mahendra Patel
(74) *Attorney, Agent, or Firm* — Leydig, Voit & Mayer, Ltd.

(57) ABSTRACT

A method for preventing fraud or misuse when a User Equipment uses a service of a public land mobile network. The User Equipment includes a Subscriber Identity Module. The Subscriber Identity Module includes address information used for the service of the public land mobile network. The Subscriber Identity Module includes an application program. The application program includes reference address information. The method includes: determining, by the application program of the Subscriber Identity Module of the User Equipment, that the address information does not correspond to the reference address information; and in response to the determining: blocking, by the application program, the service for the User Equipment and sending an error message to the public land mobile network; or invoking, by the application program, the service for the User Equipment using the reference address information.

9 Claims, 2 Drawing Sheets

(51) Int. Cl.
  *H04W 4/12* (2009.01)
  *H04W 88/02* (2009.01)

(56) References Cited

U.S. PATENT DOCUMENTS

| | | | | |
|---|---|---|---|---|
| 2004/0107368 A1* | 6/2004 | Colvin | ............ | G06F 21/121 726/30 |
| 2006/0089125 A1* | 4/2006 | Frank | ............ | H04L 63/08 455/411 |
| 2006/0189298 A1* | 8/2006 | Marcelli | ............ | H04L 63/0869 455/411 |
| 2010/0162370 A1* | 6/2010 | Altay | ............ | G06F 21/335 726/5 |
| 2011/0250867 A1* | 10/2011 | Lee | ............ | 455/411 |
| 2011/0281589 A1* | 11/2011 | De Beer | ............ | 455/445 |

* cited by examiner

METHOD FOR PREVENTING FRAUD OR MISUSE WHEN USING A SPECIFIC SERVICE OF A PUBLIC LAND MOBILE NETWORK BY A USER EQUIPMENT, SUBSCRIBER IDENTITY MODULE AND APPLICATION PROGRAM

CROSS-REFERENCE TO RELATED APPLICATIONS

This application is a U.S. National Phase application under 35 U.S.C. §371 of International Application No. PCT/EP2011/004583, filed on Sep. 13, 2011. The International Application was published in English on Mar. 21, 2013 as WO 2013/037383 A1 under PCT Article 21(2).

FIELD

The present invention relates a method for preventing fraud or misuse when using a specific service of a public land mobile network by a User Equipment. The present invention further relates to Subscriber Identity Module for preventing fraud or misuse when a User Equipment equipped with the Subscriber Identity Module uses a specific service of a public land mobile network.

BACKGROUND

Operators of telecommunications networks, especially public land mobile networks, typically protect network nodes that are used to provide specific services for User Equipments, such as the Short Message Service Center for providing the short message service, wherein the protection is provided such that customers that should not use such a network node are excluded from using such a network node.

In case this protection of such a network node is permanently or temporarily not available or efficient, fraud or misuse scenarios can occur. For example, with respect to the short message service, such a fraud or misuse scenario might occur in case when a User Equipment (of a home public land mobile network) roams in a visited public land mobile network (different to the home public land mobile network) and an unprotected Short Message Service Center in a further public land mobile network instead of the (home) Short Message Service Center in the home public land mobile network. In such a case, mobile originated short message service traffic is routed from the visited public land mobile network (where the User Equipment roams) to the further public land mobile network, and therefore bypasses the home public land mobile network. Nevertheless, the inter operator tariffs still apply in the relation between the visited public land mobile network and the home public land mobile network, which can cause huge damages to the operator of the home public land mobile network. Another example of primarily a misuse case and not a fraud situation would be to use a wrong Short Message Service Center address setting within a home public land mobile network due to the fact that the User Equipment has been bought secondhand and has been used in another public land mobile network, and hence with another setting of the Short Message Service Center address.

SUMMARY

In an embodiment, the invention provides a method for preventing fraud or misuse when a User Equipment uses a service of a public land mobile network. The User Equipment includes a Subscriber Identity Module. The Subscriber Identity Module includes address information used for the service of the public land mobile network. The Subscriber Identity Module includes an application program. The application program includes reference address information. The method includes: determining, by the application program of the Subscriber Identity Module of the User Equipment, that the address information does not correspond to the reference address information; and in response to the determining: blocking, by the application program, the service for the User Equipment and sending an error message to the public land mobile network; or invoking, by the application program, the service for the User Equipment using the reference address information.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
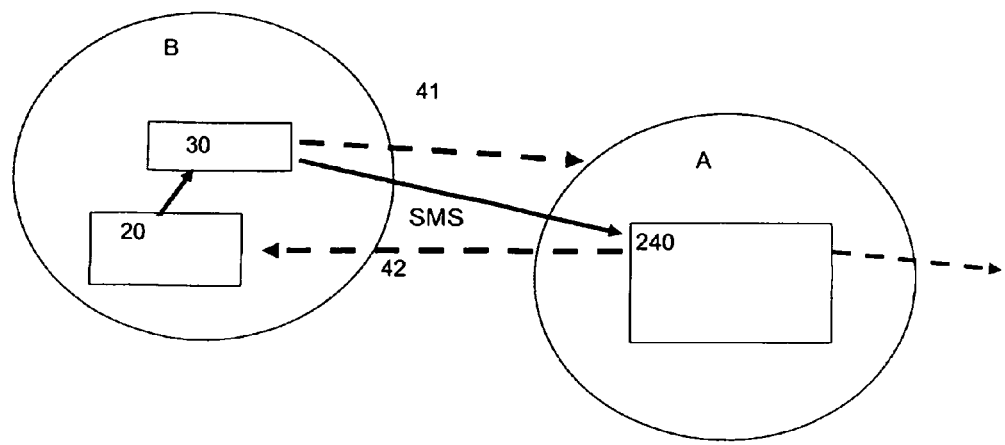
FIG. 1 schematically illustrates the handling of a mobile originating short message sent from a User Equipment roaming in a visited public land mobile network which is different from the home public land mobile network of that User Equipment.

The present invention provides cost effective solution for preventing such fraud or misuse scenarios when using a specific service of a public land mobile network by a User Equipment.

The invention provides a method for preventing fraud or misuse when using a specific service of a public land mobile network by a User Equipment, wherein the User Equipment comprises a Subscriber Identity Module, wherein the Subscriber Identity Module comprises an address information used for the specific service of the public land mobile network, wherein the Subscriber Identity Module comprises an application program, wherein the application program comprises a reference address information, wherein the application program is provided such that the following steps are executed:

in a first step, it is verified whether the address information corresponds to the reference address information, in a second step, and in case that the verification of the first step holds a negative result, either the specific service is blocked, at least temporarily, for the User Equipment, or the specific service is invoked using the reference address information.

According to the present invention, it is thereby advantageously possible that fraud or misuse can be effectively reduced by enforcing the use of the correct address information, especially for specifying a network node using the address information.

According to another preferred embodiment of the present invention, in case that, during the second step, the specific service is blocked for the User Equipment, an error message is sent to the public land mobile network.

According to the present invention, it is thereby advantageously that the public land mobile network, especially the home public land mobile network is informed about the incorrect setting of the address information such that a self-healing process can be triggered, e.g. by providing a configuration message to the corresponding User Equipment in order to change the incorrect address information.

According to a preferred embodiment of the present invention, the address information is provided at a specific memory location within the Subscriber Identity Module, wherein the application program is configured such that, during the first step, the specific memory location within the Subscriber Identity Module is verified repeatedly, at least once in a predetermined time interval.

Thereby, it is advantageously possible according to the present invention that a wrong setting of the address information can be detected easily and quickly. Especially, it is advantageously possible to transmit the application program to the User Equipment and, without an interruption of the functionality of the User Equipment/Subscriber Identity Module (especially without rebooting the User Equipment), verification of the address information is performed.

According to a further preferred embodiment of the present invention, a request of the User Equipment to use the specific service comprises the address information, wherein the User Equipment is configured such that each request of the User Equipment to use the specific service is directed to the Subscriber Identity Module, wherein the application program is configured such that, during the first step, the address information of the redirected request of the User Equipment to use the specific service is verified.

Thereby, it is advantageously possible according to the present invention that no request of the specific service can be transmitted to the public land mobile network without the verification by the Subscriber Identity Module (during the first step of the inventive method).

It is also possible that both a repeated verification of the correct address information and a forced redirection of any requests of the User Equipment to the specific service towards the Subscriber Identity Module are performed.

According to another preferred embodiment of the present invention, the specific service is the short message service.

Thereby, it is advantageously possible to avoid fraud and misuse damages for an operator of a public land mobile network in an efficient manner.

It is furthermore preferred that the address information and the reference address information relates to the address of a Short Message Service Center used by the User Equipment.

Thereby, it is efficiently possible according to the present invention that no short message service functionality can be used by the User Equipment without using the correct Short Message Service Center.

According to the present invention, it is furthermore preferred that the reference address information relates to the address of a Short Message Service Center used by the User Equipment but that the reference address information is not a complete address information (being able to specify a network entity in the telecommunications network) such as, e.g., a global title, but that the reference address information corresponds to the country code of the correct address information 22 to be used or that the reference address information corresponds to the country code and additionally a certain number (such as one or two or three or four) of digits, specifying, e.g., the public land mobile network of the operator or the like. If in this case a comparison (during the first step of the method according to the present invention) of the reference address information with the address information (or with the corresponding part or with the corresponding part of the address information) holds that the address information is not correct, the appropriate actions are taken as specified in the second step of the present invention.

Furthermore, the present invention relates to a Subscriber Identity Module for preventing fraud or misuse when a User Equipment equipped with the Subscriber Identity Module uses a specific service of a public land mobile network, wherein the Subscriber Identity Module comprises an address information used for the specific service of the public land mobile network, wherein the Subscriber Identity Module comprises an application program, wherein the application program comprises a reference address information, wherein the application program is provided such that:

a verification is executed whether the address information corresponds to the reference address information, and in case that the verification holds a negative result, either the specific service is blocked, at least temporarily, for the User Equipment, or the specific service is invoked using the reference address information.

Additionally, the present invention relates to a program comprising a computer readable program code which, when executed on a computer or on a Subscriber Identity Module, causes the computer or the Subscriber Identity Module to perform an inventive method.

Still additionally, the present invention relates to computer program product for preventing fraud or misuse when using a specific service of a public land mobile network by a User Equipment, the computer program product comprising a computer program stored on a storage medium, the computer program comprising program code which, when executed on a computer or on a Subscriber Identity Module, causes the computer or the Subscriber Identity Module to perform an inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, the handling of a mobile originating short message (SMS) in a telecommunications network is schematically shown. The short message (SMS) is sent from a User Equipment 20 roaming in a visited public land mobile network B which is different from a home public land mobile network A of that User Equipment 20. The User Equipment 20 sends a request for using the short message service of the visited public land mobile network B to a specific network node 30 (typically a Mobile Switching Center 30) of the visited public land mobile network B. The request of the User Equipment 20 specifies, using address information, the Short Message Service Center 240 of the home public land mobile network A and the short message (SMS) is sent triggering an IOT (inter operator tariff) charging event 41 from the visited public land mobile network B to the home public land mobile network A and a client charging event 42 from the home public land mobile network A to the User Equipment/the subscriber.

Figure 2:
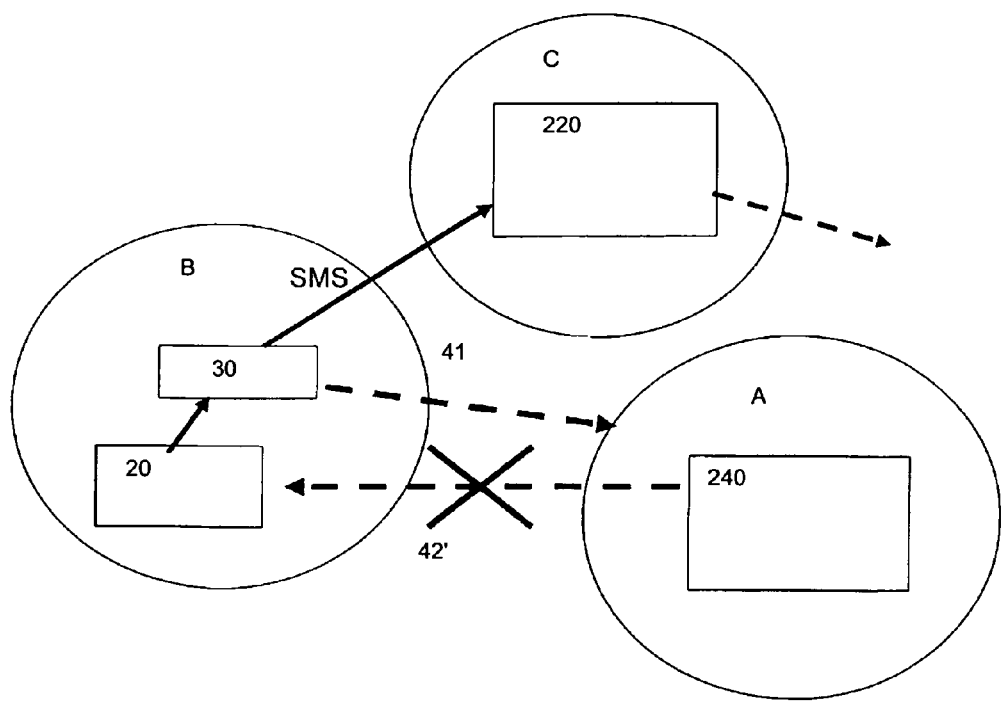
FIG. 2 schematically illustrates a fraud scenario of the handling of a mobile originating short message sent from a User Equipment roaming in a visited public land mobile network, wherein the home public land mobile network is bypassed by using a Short Message Service Center of a further public land mobile network instead of the Short Message Service Center of the home public land mobile network.

In FIG. 2, a fraud or misuse scenario of a mobile originating short message (SMS) in a telecommunications network is schematically shown. The short message (SMS) is sent from a User Equipment 20 roaming in a visited public land mobile network B which is different from a home public land mobile network A of that User Equipment 20. The User Equipment 20 sends a request for using the short message service of the visited public land mobile network B to a specific network node 30 (typically a Mobile Switching Center 30) of the visited public land mobile network B. The request of the User Equipment 20 specifies, by using address information, (and instead of the Short Message Service Center 240 of the home public land mobile network A) the Short Message Service Center 220 of a further public land mobile network C. This results in the short message (SMS) being sent via the further public land mobile network C and bypassing the home public land mobile network A. Involving the visited public land mobile network nevertheless triggers an IOT (inter operator tariff) charging event 41 from the visited public land mobile network B to the home public land mobile network A. However, due to the fact that the home public land mobile network A is bypassed regarding the handling of the short message, a corresponding client charging event 42' from the home public land mobile network A to the User Equipment/the subscriber is not possible. That is why huge amounts of short messages can be sent using this fraud or misuse scenario causing at the home public land mobile network massive losses. Currently, it is not mandatorily required that the visited public land mobile network B informs the home public land mobile network A about such irregularities. Therefore, such frauds or misuses cannot be quickly detected by the home public land mobile network A.

Figure 5:
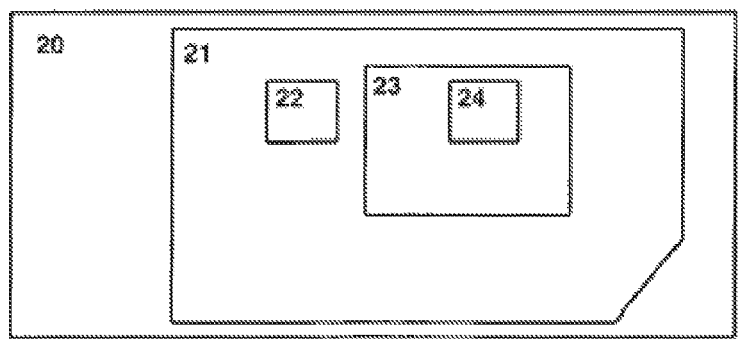
FIG. 5 schematically illustrates a User Equipment 20.

According to the present invention, a method is provided that is able to avoid the situation where a User Equipment uses wrong address information 22 and hence a wrong network node (such as a Short Message Service Center 220). The User Equipment 20 is schematically illustrated in FIG. 5.

According to the present invention, this is achieved by providing the Subscriber Identity Module 21, which is used with the User Equipment 20, such that the Subscriber Identity Module 21 comprises an address information 22 used for the specific service of the public land mobile network, wherein the Subscriber Identity Module 21 comprises an application program 23, wherein the application program 23 comprises a reference address information 24, wherein the application program 23 is provided such that the following steps are executed:

in a first step, it is verified whether the address information 22 corresponds to the reference address information 24, in a second step, and in case that the verification of the first step holds a negative result, either the specific service is blocked, at least temporarily, for the User Equipment 20, or the specific service is invoked using the reference address information 24.

Thereby, it is possible to provide a detection and/or correction mechanism of wrong address information 22 on the Subscriber Identity Modules 21 of users or subscribers of the home public land mobile network A. Thereby, it is advantageously possible to detect wrong settings in the address information 22. In case that a wrong setting of the address information 22 is detected, different options exist: In one alternative embodiment of the present invention, the specific service—e.g. the short message service—is blocked, i.e. no further service request of this kind (i.e. a user initiated short message) can be sent. In another alternative embodiment of the present invention, a correction is applied to the false address information 22 and a this wring address information 22 is replaced by a reference address information 24 which part of the application program 23, i.e. the specific service is invoked using the reference address information 24.

Figure 3:
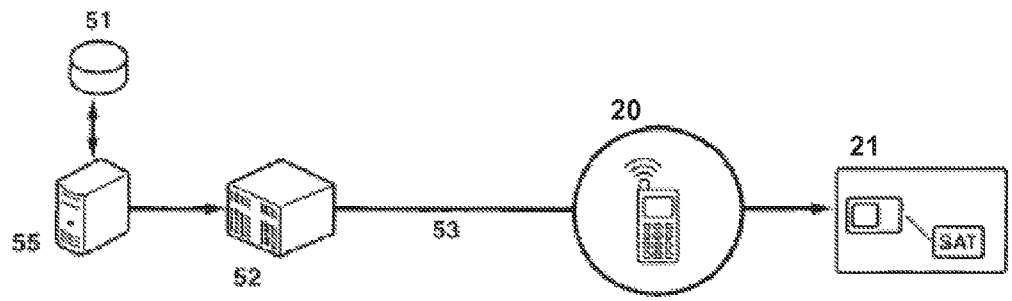
FIG. 3 schematically illustrates a method for providing a Subscriber Identity Module with an application program for performing the inventive method.

In FIG. 3, a method for providing a Subscriber Identity Module 21 with an application program 23 for performing the inventive method is schematically shown: a server (e.g., an OTA server (OTA meaning "Over The Air")) 55 checks with a database 51 whether a Subscriber Identity Module 21 of a specific User Equipment 20 is enabled to receive and store the program information of the application program 23. The information of the application program 23 is then transmitted to the User Equipment 20, especially using an short message service transmission method, involving an Short Message Service Center 52. The Short Message Service Center 52 sends binary short messages 53 comprising the application program 23 to the User Equipment 20. The application program 23 is then saved (and installed) to a memory of the Subscriber Identity Module 21.

According to the present invention, it is possible and preferred that once the application program 23 is saved and installed to the Subscriber Identity Module 21, certain parameters of the application program 23 such as values of the reference address information 24 or parameters defining the appropriate action to be taken in the second step of the inventive method (in case that it is verified in the first step that the verification of the first step holds a negative result) are modified. This is preferably be realized by an OTA mechanism comparable to the transmission of the application program itself to the Subscriber Identity Module 21.

The application program 23 according to the present invention is preferably a so-called "SIM Application Toolkit application" or SAT application. The application program 23 or SAT application 23 can be provided to any new Subscriber Identity Modules to be distributed to new customers but also to all (or at least the vast majority) of Subscriber Identity Modules 21 already circulating. This is because the vast majority of circulating Subscriber Identity Modules 21 are OTA enabled such that the application program 23 can be simply stored on such Subscriber Identity Modules 21. This means that the method according to the present invention can be implemented in a very quick manner. During roll-out of the application program 23, it is possible to transfer (or not to transfer) the application program 23 to different Subscriber Identity Modules depending on an information in a database about the Subscriber Identity Modules.

Furthermore, especially for the case that some models of User Equipments are not compatible with running the application program 23, it is possible to control the use of the application program 23 via the following steps:
- in a first step, the application program 23 is stored in the Subscriber Identity Module 21 of a User Equipment 20,
- in a second step, the application program 23 sends an information to the public land mobile network about the value of the IMEI (International Mobile Equipment Identity),
- Based on this IMEI information, it is possible to look up in a database whether the Subscriber Identity Module (and the corresponding User Equipment 20) are compatible with running the application program 23. If this is the case the application program 23 is (remotely) switched on or off, dependant on the result of the database lookup.

Figure 4:
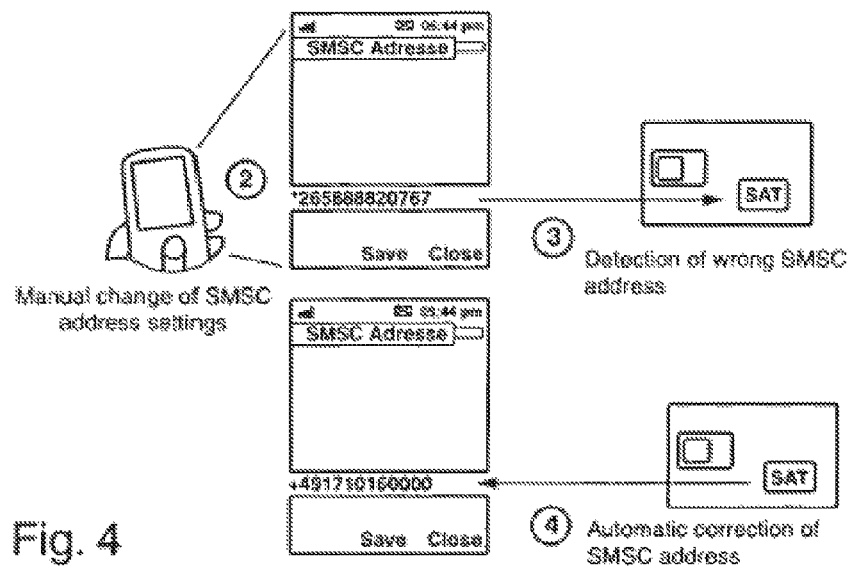
FIG. 4 schematically illustrates an implementation of the inventive method.

FIG. 4 schematically illustrates an implementation of the inventive method, where in a first step, a detection of the address information 22 is provided and compared with a reference address information 24.
The reference address information 24 is either a complete address information (e.g. in the form of a global title) being able to specify a network entity in the telecommunications network/public land mobile network. In this case, it is possible according to the present invention to simply replace the use of the address information 22 by the use of the reference address information 24.
However, according to an alternative embodiment of the present invention, it is also possible that the reference address information 24 is not a complete address information (being able to specify a network entity in the telecommunications network). For example, the reference address information could simply comprise the country code of the correct address information 22 to use. If in this case a comparison of the reference address information 24 with the address information 22 (or with the corresponding part of the address information 22) holds that the address information 22 is not correct, it is not possible to simply replace the use of the address information 22 by the use of the reference address information 24. In this case, it will be preferred to block the specific service for the User Equipment at least temporarily.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for preventing fraud or misuse when a User Equipment uses a service of a public land mobile network, wherein the User Equipment comprises a Subscriber Identity Module, wherein the Subscriber Identity Module comprises address information used for the service of the public land mobile network, wherein the Subscriber Identity Module comprises an application program, wherein the application program comprises reference address information, the method comprising:
   - determining, by the application program of the Subscriber Identity Module of the User Equipment, that the address information does not correspond to the reference address information; and
   - in response to the determining:
     - replacing the address information with the reference address information in case of the reference address information being a complete address information that specifies a network entity, and invoke the service for the User Equipment; and
     - blocking, at least temporarily, by the application program, the service for the User Equipment and sending an error message to the public land mobile network in case of the reference address information being incomplete address information that specifies a country code and that does not specify a network entity;
   - wherein the address information is provided at a specific memory location within the Subscriber Identity Module; and
   - wherein the application program is configured such that the specific memory location within the Subscriber Identity Module is verified repeatedly and at least once in a predetermined time interval.

2. The method according to claim 1, wherein a request of the User Equipment to use the service comprises the address information, wherein the User Equipment is configured such that each request of the User Equipment to use the specific service is directed to the Subscriber Identity Module, and wherein the application program is configured to verify the address information of the request.

3. The method according to claim 1, wherein the service is the short message service.

4. The method according to claim 1, wherein the address information and the reference address information correspond to one or more addresses of one or more Short Message Service Centers.

5. A Subscriber Identity Module for preventing fraud or misuse when a User Equipment equipped with the Subscriber Identity Module uses a service of a public land mobile network, the Subscriber Identity Module comprising:
a processor;
address information corresponding to the service of the public land mobile network; and
a non-transitory computer-readable medium having an application program stored thereon, wherein the application program comprises reference address information and is configured to:
determine that the address information does not correspond to the reference address information; and
in response to the determination:
replace the address information with the reference address information in case of the reference address information being a complete address information that specifies a network entity, and invoke the service for the User Equipment; and
block, at least temporarily, the service for the User Equipment network in case of the reference address information being incomplete address information that specifies a country code and that does not specify a network entity;
wherein the address information is provided at a specific memory location within the Subscriber Identity Module; and
wherein the application program is configured such that the specific memory location within the Subscriber Identity Module is verified repeatedly and at least once in a predetermined time interval.

6. The Subscriber Identity Module according to claim 5, wherein a request of the User Equipment to use the service comprises the address information, wherein the User Equipment is configured such that each request of the User Equipment to use the specific service is directed to the Subscriber Identity Module, and wherein the application program is configured to verify the address information of the request.

7. The Subscriber Identity Module according to claim 5, wherein the service is the short message service.

8. The Subscriber identity Module according to claim 5, wherein the address information and the reference address information correspond to one or more addresses of one or more Short Message Service Centers.

9. A non-transitory, computer-readable medium having computer-executable instructions stored thereon for preventing fraud or misuse when a User Equipment uses a service of a public land mobile network, wherein the User Equipment comprises a Subscriber identity Module, wherein the Subscriber Identity Module comprises address information used for the service of the public land mobile network, wherein the Subscriber identity Module comprises an application program, wherein the application program comprises reference address information, the computer-executable instructions, when executed by a processor, causing the following steps to be performed:
determining, by the application program, that the address information does not correspond to the reference address information; and
in response to the determining:
replacing, by the application program, the address information with the reference address information in case of the reference address information being a complete address information that specifies a network entity, and invoking the service for the User Equipment; and
blocking, by the application program, at least temporarily, the service for the User Equipment and sending an error message to the public land mobile network in case of the reference address information being incomplete address information that specifies a country code and that does not specify a network entity;
wherein the address information is provided at a specific memory location within the Subscriber Identity Module; and
wherein the application program is configured such that the specific memory location within the Subscriber Identity Module is verified repeatedly and at least once in a predetermined time interval.

* * * * *